(12) United States Patent
Jai et al.

(10) Patent No.: US 8,018,094 B1
(45) Date of Patent: Sep. 13, 2011

(54) INTERIM POWER SOURCE

(75) Inventors: Benchiao Jai, Mountain View, CA (US);
William H. Whitted, Woodside, CA (US); William Hamburgen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/759,632

(22) Filed: Apr. 13, 2010

Related U.S. Application Data

(63) Continuation of application No. 11/026,551, filed on Dec. 30, 2004, now Pat. No. 7,696,643.

(51) Int. Cl.
*H02J 1/00* (2006.01)
*H02J 3/00* (2006.01)

(52) U.S. Cl. .......................................................... 307/80

(58) Field of Classification Search .............. 307/64–66, 307/80
See application file for complete search history.

(56) References Cited

U.S. PATENT DOCUMENTS

| 5,612,580 A | * | 3/1997 | Janonis et al. | .................. 307/64 |
| 5,994,794 A | * | 11/1999 | Wehrlen | .......................... 307/66 |

* cited by examiner

*Primary Examiner* — Jared Fureman
*Assistant Examiner* — Carlos Amaya
(74) *Attorney, Agent, or Firm* — Fish & Richardson P.C.

(57) ABSTRACT

An interim power source includes an energy storage, a switch coupled with the energy storage, and a control circuit coupled with the switch. The switch selects a source of power being delivered out of an output power terminal to an electronic device. The control circuit may cause the switch to select the source of power from at least one of an input power terminal and the energy storage. The input power terminal may include a main power source and a backup or secondary power source.

26 Claims, 3 Drawing Sheets

INTERIM POWER SOURCE

BACKGROUND

In a data processing system, such as a computer system, damage to the integrity of data may be caused by a loss of power or a drop below a minimum operational voltage on the power supply.

SUMMARY

In an embodiment, an interim power source includes an energy storage, a switch coupled with the energy storage, and a control circuit coupled with the switch. The switch selects a source of power being delivered out of an output power terminal to an electronic device. The control circuit may cause the switch to select the source of power from at least one of an input power terminal and the energy storage. The input power terminal may include a main power source and a backup or secondary power source.

DETAILED DESCRIPTION

Embodiments of an interim power source are described herein. This description of the embodiments is divided into four sections. The first section describes a system overview. The second section describes an example operating environment and system architecture. The third section describes system operations. The fourth section provides some general comments.

Overview

This section provides a broad overview of a system including an interim power source. In embodiments described herein, the system includes a data processing system, a main power source and an interim power source.

Figure 1:
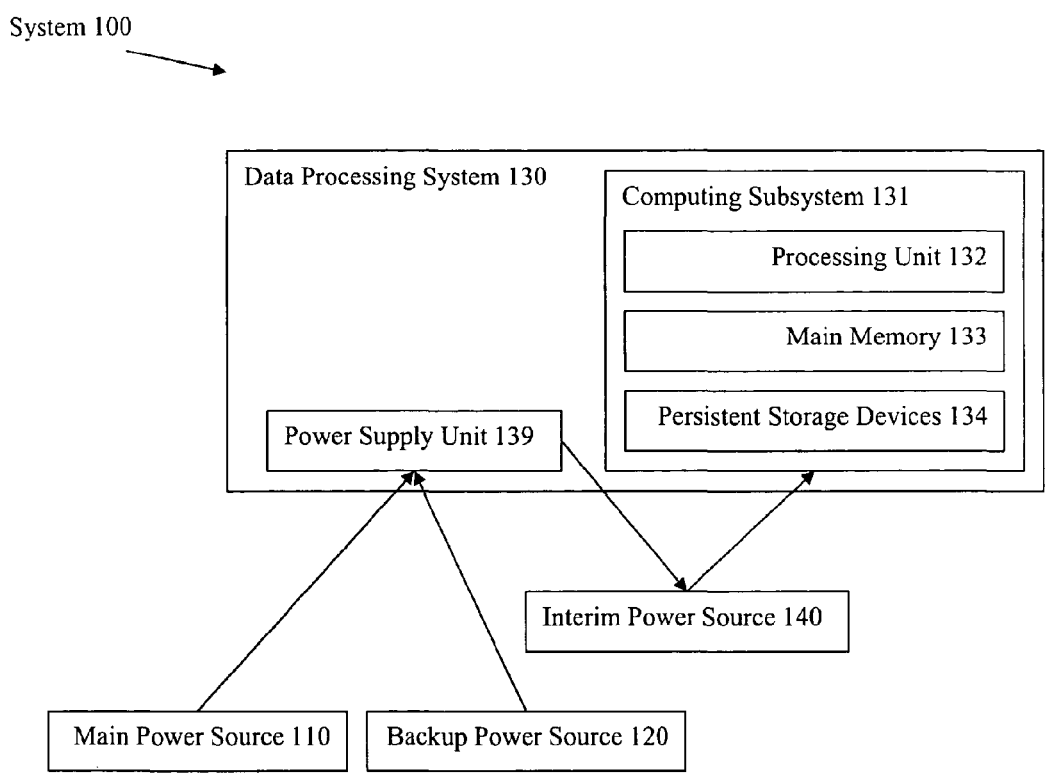
FIG. 1 illustrates a schematic block diagram of a system according to an example embodiment.

FIG. 1 illustrates a schematic block diagram of a system 100 according to an example embodiment. The system 100 includes a main power source 110, an optional backup power source 120, a data processing system 130, and an interim power source 140.

The data processing system 130, in various embodiments, may include a personal computer, a desktop computer, a workstation, a server class computer, a terminal computing device, or other such devices. The data processing system 130, in various embodiments, includes a computing subsystem 131 and a power supply unit 139 that is used to convert the power supplied by the main power source 110 or the backup power source 120 to forms usable by the components inside the computing subsystem 131. The computing subsystem 131, in various embodiments, includes one or more processing units 132, a main memory 133 such as RAM (Random Access Memory), and one or more persistent storage devices 134 such as disks. In an embodiment, the power supply unit 139 is not present because the power supplied by the main power source 110 and the backup power source 120 are directly usable by the computing subsystem 131. In yet another embodiment, the power supply unit 139 is not included and the power conversion function is performed by the interim power source 140.

In various embodiments, the power supply unit 139 accepts alternating current (AC) input of 90V-240V, AC input of 90V-120V, AC input of 200V-240V, DC input of +48V, DC input of +24V, or DC input of -48V. In various embodiments, the power supply unit 139 produces one or more of direct current (DC) output at +12V, +5V, +3.3V, +2.5V, +1.8V, +1.2V, -5V and -12V.

The main power source 110 and the backup power source 120, in various embodiments, include commercially available utility AC power connections and privately owned AC power generators, such as diesel generators. In an embodiment, the main power source 110 is a power connection from a utility company and the backup power source 120 is a power connection from a different power grid of the same utility company. In another embodiment, the main power source 110 is a power connection from a utility company and the backup power source 120 is another power connection from a different utility company. In yet another embodiment, the main power source 110 is a power connection from a utility company and the backup power source 120 is a diesel generator or a natural gas generator. In yet another embodiment, the main power source 110 is a power connection from a utility company and the backup power source 120 is a cluster of fuel cells.

The backup or secondary power source 120 may replace the interim power source 140 after an initial warm up period of the backup power source 120 or when the backup power source 120 is ready to replace the interim power source 140 to supply power to the subsystem.

The interim power source 140, in various embodiments, includes a battery, a cluster of batteries, a supercapacitor, or a cluster of supercapacitors. In various embodiments, the batteries or supercapacitors have a voltage range of about 10 volts to about 17 volts. The interim power source 140, in various embodiments, also includes a control circuit, as described in more detail below. In a particular embodiment, the battery voltage includes about 12 volts with about a 15% variance, to about 13.8 volts when fully charged, and to about 10.2V when discharged. In some embodiments, the variance is greater than about 15%. The battery is rechargeable in embodiments. In an embodiment, the battery is a UP-RW1245P1 manufactured by Panasonic. In an embodiment, the supercapacitor is an Ultracapacitor manufactured by Maxwell Technologies®, and is described in more detail at http://www.maxwell.com/ultracapacitors/.

The interim power source 140 supplies power to the computing subsystem 131 when the main power source 110 is disrupted and/or falls below a threshold voltage level, until the backup power source 120 starts supplying a determined threshold of power, the main power source returns to normal operation and/or until the computing subsystem shuts off substantially safely.

The interim power source may include a means for temporarily replacing the main power source and/or a means for temporarily supplying power until the backup power source is ready. The interim power source 140 may supply power for one minute or less to the package assembly and may include one (1) amp hour per processing unit of the computing subsystem 131. The interim power source 140 may be disposed on a motherboard of the computing subsystem 131 to supply DC power to the motherboard.

The power supply unit 139 outputs a single voltage, in an embodiment, when the computing subsystem 131 correspondingly uses a single voltage (12V, for example). In this embodiment, the interim power source supplies the single voltage power in replacement. In an additional embodiment, the power supply unit 139 outputs multiple voltages, when the computing subsystem 131 correspondingly uses multiple voltages (3.3V, 5V and 12V, for example). In this additional embodiment, a plurality of interim power sources supplies the multiple voltage power in replacement. In another additional embodiment, the system of FIG. 1 includes a plurality of package assemblies each supplied with power from the interim power source 140 when appropriate. In this additional embodiment, the interim power source utilizes an appropriately larger capacity battery or capacitor, or multiple batteries/capacitors.

Hardware, Operating Environment, and System Architecture

This section provides an overview of the example hardware and operating environment in which embodiments of the invention can be practiced. This section also describes an example architecture for the interim power source. The operation of the system components will be described in the next section.

In embodiments described herein, the interim power source may include an energy storage, a switch coupled with the energy storage, and a control circuit coupled with the switch. The switch may select a source of power being delivered out of an output power terminal to an electronic device. The control circuit may cause the switch to select the source of power from at least one of an input power terminal and the energy storage. In embodiments, the input power terminal may include a main power source and a backup or secondary power source. The energy storage may include a battery and/or a supercapacitor in example embodiments.

Figure 2:
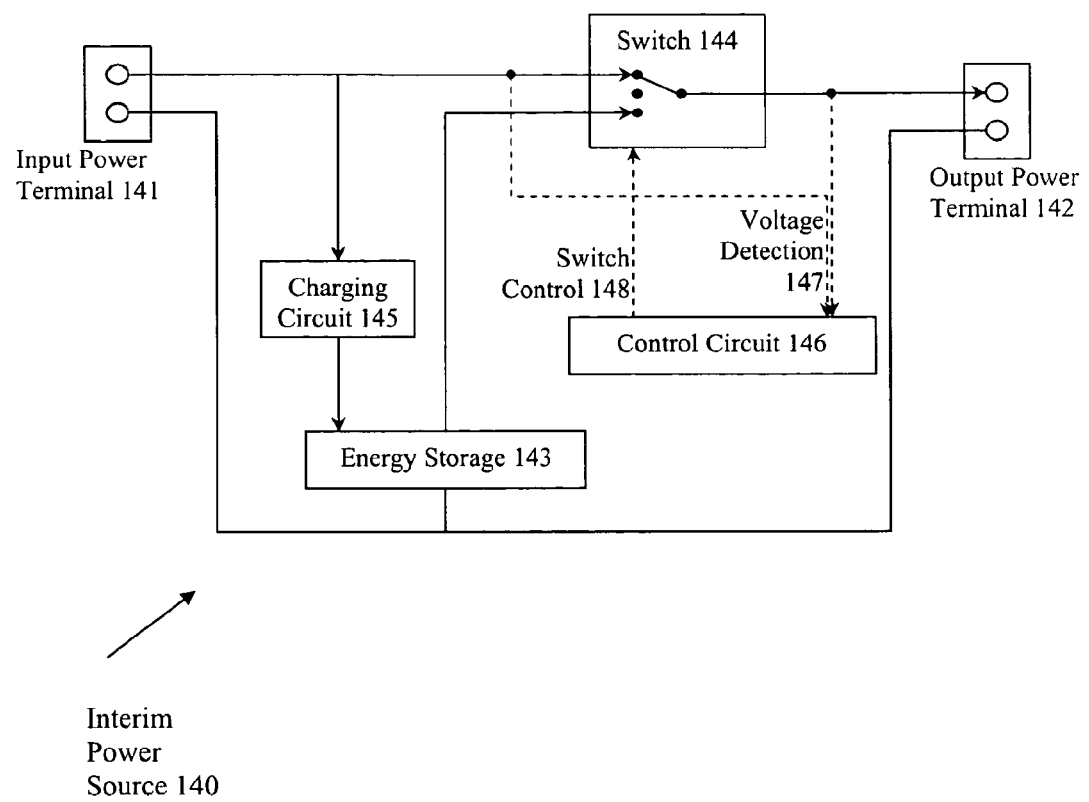
FIG. 2 illustrates a schematic block diagram of an interim power source according to an example embodiment.

FIG. 2 illustrates a schematic block diagram of an interim power source 140 according to an example embodiment. The interim power source 140 includes an input power terminal 141 to receive input power from the power supply unit 139, an output power terminal 142 to deliver power to the computing subsystem 131, an energy storage 143, a charging circuit 145 to regulate the power flowing into the energy storage 143, a switch 144 to select the source of power being delivered out of the output power terminal 142, and a control circuit 146 that detects the input and output voltages through a voltage detection mechanism 147 and causes the switch 144 through a switch control 148 to select among the input power terminal 141 (the "up" position), the energy storage 143 (the "down" position), and complete shut-off (the "middle" position). The control circuit may detect a state of disruption in the input and/or output power from the power supply unit to the computing subsystem.

The energy storage 143 may be constructed with one or more batteries. In another embodiment, the energy storage 143 is constructed with one or more supercapacitors.

The voltage detection 147 may comprise one or more voltage comparators such as operational amplifiers. The voltage detection 147 may comprise analog to digital (A/D) converters and microcontrollers.

The interim power source 140 may replace an Uninterrupted Power System (UPS) that may be between the main power source 110, the backup power source 120, and/or the power supply unit 139.

System Operations and Example Implementation

This section describes operations performed by embodiments of the invention. In certain embodiments, the operations are performed by instructions residing on machine-readable media (e.g., software), while in other embodiments, the methods are performed by hardware or other logic (e.g., digital logic). Further in this section, an example implementation will be described. While this section describes an example implementation, other embodiments of the invention can be implemented differently.

Figure 3:
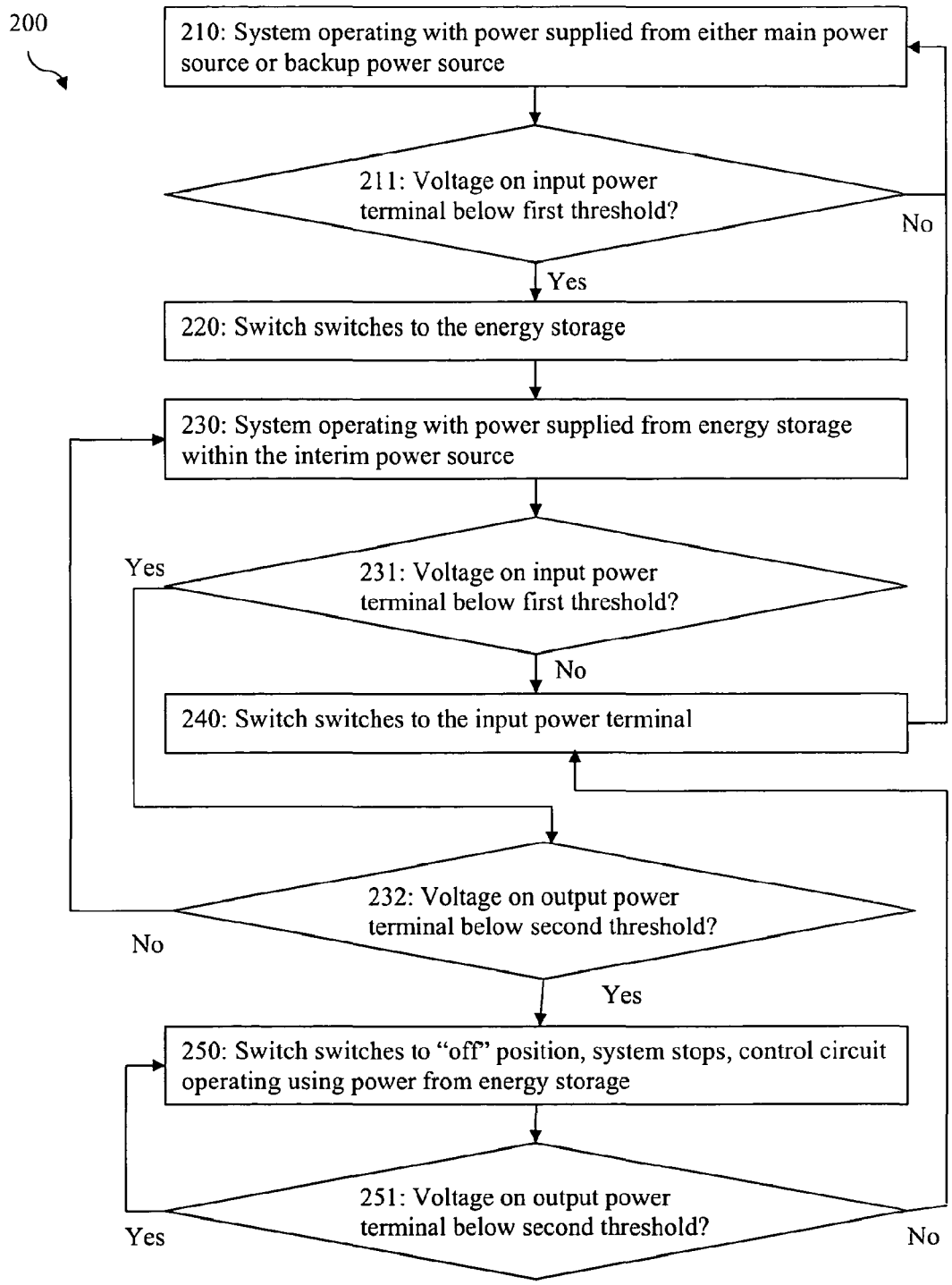
FIG. 3 illustrates an example flow diagram of a method according to an example embodiment.

FIG. 3 illustrates an example flow diagram of a method 200 according to an example embodiment. At block 210, the system 100 may operate with power supplied from either the main power source 110 or the backup power source 120. The data processing system 130 may be supplied with power from either the main power source 110 or the backup power source 120 to the input power terminal 141 through the power supply unit 139. At block 210, the switch 144 may be at the "up" position shown in FIG. 2. At block 211, a determination is made as to whether the voltage at the input power terminal 141 is below a determined threshold 1 as described in embodiments herein. If no to the query at block 211, then the process returns to block 210 to continue supplying power from the main power source 110 or the backup power source 120. If yes to the query at block 211, then the switch 144 is switched to the "down" position at block 220.

The data processing system 130 operates using power supplied from the energy storage 143 within the interim power source 140 at block 230. At block 231, another determination is made as to whether the voltage at the input power terminal 141 from one of the main power source and the backup power source is below the determined threshold 1. If no to the query at block 231, the switch 144 is switch backed to the "up" position at block 240 to the input power terminal 141, and the process returns to block 210. If yes to the query at block 231, another determination is made at block 232 as to whether the voltage at the output power terminal 142 is below a determined threshold 2. If no to the query at block 232, then the process returns to block 230. If yes to the query at block 232, the switch 144 is switched to the "middle" position and/or "off" position and the system 100 stops operating, including the data processing system 130, at block 250.

The control circuit 146 continues to operate by drawing power from the energy storage 143 at block 250. At block 251, yet another determination may be made as to whether the voltage at the output power terminal 142 is below the determined threshold 2. If yes to the query at block 251, the process returns to block 250. If no to the query at block 251, the process goes to block 240.

The energy storage 143 may be a Sealed Lead Acid (SLA) battery with nominal voltage of 12V. The power supply unit 139 may generate an output of 13.6V, where the determined threshold 1 may be 12V, and the determined threshold 2 may be 11V. The energy storage 143 may meet at least one of a PC/XT, AT, Baby AT, LPX, ATX/NLX, SFX, and WTX form factor.

General

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced. FIGS. 1 to 3 are merely representational and are not drawn to scale. Certain proportions thereof may be exaggerated, while others may be minimized.

Applications that may include the apparatus and systems of various embodiments broadly include a variety of electronic and computer systems, such as personal computers, desktop computers, workstations, server class computers, and terminal computing devices. The elements, materials, geometries, dimensions, and sequence of operations can all be varied to suit particular packaging requirements.

Some embodiments implement the functions in two or more specific interconnected hardware modules or devices with related control and data signals communicated between and through the modules, or as portions of an application-specific integrated circuit. Thus, the example process flow is applicable to software, firmware, and hardware implementations. The software comprises computer executable instructions stored on computer readable media such as Random Access Memory (RAM) or other types of storage devices. The term "computer readable media" is also used to represent software-transmitted carrier waves. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims. For example, many other embodiments will be apparent to those of skill in the art upon reviewing the above description. Parts of some embodiments may be included in, or substituted for, those of other embodiments. While the foregoing examples of dimensions and ranges are considered typical, the various embodiments are not limited to such dimensions or ranges. Additionally, structural, logical, and electrical changes may be made without departing from the scope of the disclosed subject matter.

Various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

What is claimed is:

1. An interim power source comprising:
   an input power terminal to receive input power;
   an output power terminal to deliver power coupled with the input power terminal;
   an energy storage coupled with the output power terminal;
   a charging circuit coupled to the energy storage to regulate power flowing into the energy storage;
   a switch coupled to the output power terminal to connect a source of power being delivered from the output power terminal; and
   a control circuit coupled with the output power terminal to detect an input voltage associated with the input power terminal, to detect an output voltage associated with the output power terminal, and to cause the switch to connect the source of power being delivered from the output power terminal between the input power terminal or the energy storage,
   wherein the input power terminal is operable to receive the input power from a plurality of external power sources through a power supply unit independent of the interim power source, and supply the input power to the output power terminal.

2. The power source of claim 1 wherein the control circuit includes a voltage detection mechanism to detect the input and output voltages.

3. The power source of claim 2 wherein the voltage detection mechanism includes one or more voltage comparators.

4. The power source of claim 2 wherein the voltage detection mechanism includes one or more operational amplifiers.

5. The power source of claim 2 wherein the voltage detection mechanism includes one or more analog to digital converters and microcontrollers.

6. The power source of claim 1 further comprising a switch control to couple the control circuit to the switch.

7. The power source of claim 1 wherein the control circuit causes the switch to connect the source of power being delivered from the output power terminal between the input power terminal, the energy storage or a complete power shut-off.

8. The power source of claim 1 wherein the energy storage includes one or more batteries.

9. The power source of claim 1 wherein the energy storage includes one or more supercapacitors.

10. A system comprising:
    a power supply unit;
    a computing subsystem coupled with the power supply unit; and
    an interim power source separate from the power supply unit and coupled with the computing subsystem including:
      an input power terminal to receive input power from the power supply unit;
      an output power terminal coupled with the input power terminal to deliver power to the computing subsystem;
      an energy storage coupled with the output power terminal;
      a charging circuit coupled with the energy storage to regulate power flowing into the energy storage;
    a switch coupled to the output power terminal to select a source of power being delivered out of the output power terminal; and
    a control circuit coupled with the output power terminal to detect a state of disruption in the input power from the power supply unit, to detect a state of disruption in the output power to the computing subsystem, and to cause the switch to select the source of power from at least one of the input power terminal and the energy storage,
    wherein the input power terminal is operable to receive the input power from a plurality of external power sources through a power supply unit independent of the interim power source, and supply the input power to the output power terminal.

11. The system of claim 10 wherein the external power sources include at least one of a main power source and a backup power source.

12. The system of claim 11 wherein the interim power source supplies power being delivered out of the output power terminal until the backup power source supplies an input voltage on the input power terminal at or above a first predetermined threshold.

13. The system of claim 10 wherein the interim power source supplies power being delivered out of the output power terminal for about one minute or less.

14. The system of claim 10 wherein the interim power source includes one (1) amp hour per processing unit of the computing subsystem.

15. The system of claim 10 wherein the interim power source supplies power being delivered out of the output power terminal until the computing subsystem shuts down substantially safely.

16. The system of claim 10 wherein the interim power source includes a battery, and a voltage range of the battery includes about 10 volts to about 17 volts.

17. The system of claim 10 wherein the interim power source includes a battery having a battery voltage of about 12 volts with about a 10% variance.

18. A system comprising:
   a main power source to supply power to a computing subsystem through a power supply unit;
   means for temporarily replacing the main power source when a voltage of the main power source drops below a predetermined input voltage level;
   a secondary power source of the computing subsystem to replace the means for temporarily replacing; and
   a switch coupled to the power supply unit, the means for temporarily replacing, and the secondary power source, wherein the power supply unit, the means for temporarily replacing, and the secondary power source are separate and distinct, and
   wherein the power supply unit is operable to provide power to one or more components of the computing subsystem when the voltage of the main power source is at or above the predetermined input voltage level, and the secondary power source is operable to provide power through the power supply unit to the one or more components of the computing subsystem in place of the means for temporarily replacing the main power source when the voltage of the main power source is below the predetermined input voltage level.

19. The system of claim 18 wherein the means for replacing the main power source includes an interim power source.

20. The system of claim 18 wherein the secondary power source includes a generator, and wherein the generator replaces the means for replacing after an initial warm up period of the generator.

21. A method comprising:
   supplying an electronic device with power from a main power source through a power supply unit;
   determining whether the power supplied by the main power source is below a predetermined threshold;
   supplying the electronic device with power from an interim power source electrically coupled to an output terminal of the power supply unit after determining that the power supplied by the main power source is below the predetermined threshold, the power supply unit external to the interim power source;
   supplying power to the electronic device from a secondary power source through the power supply unit; and
   switching between supplying power to the electronic device from the interim power source to supplying power to the electronic device from the power supply unit, wherein the power is supplied to the electronic device from the interim power source as direct current power in a form consumable by the electronic device.

22. The method of claim 21 further comprising supplying direct current power to the interim power source.

23. A process comprising:
   supplying power from a power supply unit to an input power terminal of an interim power unit that is separate from the power supply unit;
   determining whether an input voltage at an input power terminal is below a first determined threshold;
   supplying power from the power supply unit when the input voltage is not below the first determined threshold; and
   switching to an interim power supply of the interim power unit when the input voltage is below the first determined threshold,
   wherein the input power terminal is operable to receive the power from a plurality of external power sources through the power supply unit external to the interim power unit.

24. The process of claim 23, wherein switching to an interim power supply of the interim power unit when the input voltage is below the first determined threshold comprises:
   determining whether the input voltage at the input power terminal is below the first determined threshold;
   switching the power source from the interim power source to the power supply unit when the input voltage is not below the first determined threshold; and
   supplying power with the interim power supply when the input voltage is below the first determined threshold.

25. The process of claim 24, wherein supplying power with the interim power supply when the input voltage is below the first determined threshold comprises:
   determining whether an output voltage at an output power terminal is below a second determined threshold;
   supplying power with the interim power supply when the output voltage is not below the second determined threshold; and
   switching to an off position when the output voltage is below the second determined threshold.

26. The process of claim 25, wherein switching to an off position when the output voltage is below the second determined threshold comprises:
   determining whether the output voltage at an output power terminal is below the second determined threshold;
   remaining in the off position when the output voltage is below the second determined threshold; and
   switching the power source to the power supply unit when the output voltage is not below the second determined threshold.

* * * * *